(12) United States Patent
Lim et al.

(10) Patent No.: US 12,716,583 B2
(45) Date of Patent: Aug. 25, 2026

(54) COMBUSTOR, GAS TURBINE INCLUDING COMBUSTOR, AND COMBUSTOR FLOW GUIDE MEMBER MANUFACTURING METHOD

(71) Applicant: DOOSAN ENERBILITY CO., LTD., Changwon (KR)

(72) Inventors: Joong Hyun Lim, Changwon (KR); Young Gun Go, Yongin (KR); Ji Hwan Bae, Busan (KR); Han Jin Jeong, Hanam (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/943,647

(22) Filed: Nov. 11, 2024

(65) Prior Publication Data

US 2025/0198618 A1 Jun. 19, 2025

(30) Foreign Application Priority Data

Dec. 15, 2023 (KR) ........................ 10-2023-0183669

(51) Int. Cl.
*F23D 14/70* (2006.01)
*F23R 3/10* (2006.01)
*B33Y 80/00* (2015.01)

(52) U.S. Cl.
CPC ................ *F23D 14/70* (2013.01); *F23R 3/10* (2013.01); *B33Y 80/00* (2014.12)

(58) Field of Classification Search
CPC ............... F23R 3/10; F23R 3/46; F23D 14/70
See application file for complete search history.

(56) References Cited

U.S. PATENT DOCUMENTS

2009/0173074 A1* 7/2009 Johnson .................... F23R 3/14 60/737
2013/0025285 A1* 1/2013 Stewart ................... F23R 3/286 60/740
2017/0074518 A1 3/2017 Lee
2017/0276360 A1* 9/2017 Berry ........................ F23R 3/28
(Continued)

FOREIGN PATENT DOCUMENTS

CN 108869041 B 7/2020
CN 114459055 A 5/2022
EP 1985923 A2 10/2008
(Continued)

OTHER PUBLICATIONS

The KR Decision to grant, dated Aug. 27, 2025.
The EP EESR, dated Mar. 17, 2025.

*Primary Examiner* — Katheryn A Malatek
(74) *Attorney, Agent, or Firm* — Harvest IP Law, LLP

(57) ABSTRACT

A combustor includes a nozzle casing having a tubular shape, a head plate coupled to an end of the nozzle casing, a burner having a plurality of nozzles through which fuel and air are injected, and a duct assembly coupled to one side of the burner to allow the fuel to be combusted therein and combustion gases to be transferred to a turbine, wherein the burner further includes a flow guide member in a circular annulus shape installed between the plurality of nozzles and the nozzle casing to guide a flow of air into the plurality of nozzles, wherein the flow guide member includes a plurality of guide segments into which the flow guide member is divided.

15 Claims, 13 Drawing Sheets

(56) References Cited

U.S. PATENT DOCUMENTS

| | | | |
|---|---|---|---|
| 2017/0284676 | A1 | 10/2017 | North |
| 2021/0348763 | A1 | 11/2021 | Roh |

FOREIGN PATENT DOCUMENTS

| | | | |
|---|---|---|---|
| EP | 2551491 | A2 | 1/2013 |
| JP | 2000346361 | A | 12/2000 |
| KR | 10-1872801 | B1 | 6/2018 |
| KR | 20190004613 | A | 1/2019 |
| KR | 10-2019-0140426 | A | 12/2019 |
| KR | 10-2097029 | B1 | 4/2020 |
| KR | 20210136364 | A | 11/2021 |
| KR | 10-2345180 | B1 | 12/2021 |
| KR | 2023-0122348 | A | 8/2023 |
| KR | 20230116384 | A | 8/2023 |
| KR | 102602057 | B1 | 11/2023 |
| WO | 2018/205889 | A9 | 11/2018 |

* cited by examiner

COMBUSTOR, GAS TURBINE INCLUDING COMBUSTOR, AND COMBUSTOR FLOW GUIDE MEMBER MANUFACTURING METHOD

CROSS REFERENCE TO RELATED APPLICATION

The present application claims priority to Korean Patent Application No. 10-2023-0183669, filed on Dec. 15, 2023, the entire contents of which are incorporated herein for all purposes by this reference.

BACKGROUND

1. Technical Field

The present disclosure relates to a combustor, a gas turbine including the combustor, and a combustor flow guide member manufacturing method.

2. Description of the Related Art

A gas turbine is a combustion engine in which a mixture of air compressed by a compressor and fuel is combusted to produce a high temperature gas, which drives a turbine. The gas turbine is used to drive electric generators, aircraft, ships, trains, or the like.

The gas turbine generally includes a compressor, a combustor, and a turbine. The compressor serves to intake external air, compress the air, and transfer the compressed air to the combustor. The compressed air compressed by the compressor has a high temperature and a high pressure. The combustor serves to mix compressed air from the compressor and fuel and combust the mixture of compressed air and fuel to produce combustion gases, which are discharged to the gas turbine. The combustion gases drive turbine blades in the turbine to produce power. The power generated through the above processes is applied to a variety of fields such as generation of electricity, driving of mechanical units, etc.

Compressed air from the compressor is fed into the combustor, where the compressed air enters the nozzle while traveling along the inside of the nozzle casing. Here, the compressed air is fed toward the nozzle head plate and then reverses its traveling direction toward the end of the nozzle where combustion occurs.

Because the flow direction of the compressed air to burn fuel changes abruptly around the nozzle head plate, this process creates a strong swirl. The strong swirl includes a large amount of velocity component that deviates from or is opposite to the actual flow direction, which in turn causes pressure loss and reduces the efficiency of the air flow.

In addition, these swirls cause deviations in the flow rate between the center and outer portions of the burner, resulting in a low air-fuel ratio. To solve these problems, guide vanes that distribute air are conventionally installed, but the complex structure of the guide vanes makes the guide vanes difficult to manufacture and install.

SUMMARY

Accordingly, the present disclosure has been made keeping in mind the above problems occurring in the related art, and an objective of the present disclosure is to provide a combustor and a gas turbine in which a flow guide member capable of supplying air uniformly into a burner is easily manufactured and installed.

An aspect of the present disclosure provides a combustor including: a nozzle casing having a tubular shape; a head plate coupled to an end of the nozzle casing; a burner having a plurality of nozzles through which fuel and air are injected; and a duct assembly coupled to one side of the burner to allow the fuel to be combusted therein and combustion gases to be transferred to a turbine, wherein the burner further includes a flow guide member in a circular annulus shape installed between the plurality of nozzles and the nozzle casing to guide a flow of air into the plurality of nozzles, wherein the flow guide member includes a plurality of guide segments into which the flow guide member is divided.

the guide member may be divided into the plurality of guide segments in a circumferential direction of the flow guide member.

Each guide segment may form an annular sector having a central angle of 5 degrees to 180 degrees.

Each guide segment may include a pair of support plates and at least one guide vane extending in a circumferential direction between the pair of support plates and coupled to the guide vane at both circumferentially extended ends.

The guide segment may further include a nozzle support provided at one end of the support plate so as to extend in the circumferential direction to enclose an outer circumference of the plurality of nozzles.

An auxiliary guide part may be provided at the nozzle support between the pair of support plates so as to be curved toward the center of the flow guide member.

The flow guide member may further include a fixing block protruding from the support plate toward the head plate so as to be inserted between the nozzle casing and the head plate and fixed to the head plate.

The guide vane, the support plate, the nozzle support, and the fixing block may be integrally formed as one body.

Adjacent support plates of adjacent guide segments may be superimposed, wherein an elastic damping plate may be disposed between the adjacent support plates of the adjacent guide segments.

The guide vane may have a plurality of first guide ribs extending from an air inlet end toward an air outlet end and a plurality of second guide ribs extending from the air outlet end toward the air inlet end, wherein the first guide ribs and the second guide ribs are alternately arranged so as to partially overlap each other in a longitudinal direction of the guide vane.

The guide segment may be manufactured by three-dimensional printing.

Another aspect of the present disclosure provides a gas turbine including: a compressor compressing externally introduced air; a combustor mixing the compressed air from the compressor with fuel to produce a mixture and combusting the mixture; and a turbine having a plurality of turbine blades rotated by the combustion gases from the combustor, wherein the combustor includes: a nozzle casing having a tubular shape; a head plate coupled to an end of the nozzle casing; a burner having a plurality of nozzles through which fuel and air are injected; and a duct assembly coupled to one side of the burner to allow the fuel to be combusted therein and combustion gases to be transferred to a turbine, wherein the burner further includes a flow guide member in a circular annulus shape installed between the plurality of nozzles and the nozzle casing to guide a flow of air into the plurality of nozzles, wherein the flow guide member includes a plurality of guide segments into which the flow guide member is divided.

the guide member may be divided into the plurality of guide segments in a circumferential direction of the flow guide member.

The guide segment may include a pair of support plates and at least one guide vane extending in a circumferential direction between the pair of support plates and coupled to the guide vane at both circumferentially extended ends.

The guide segment may further include a nozzle support provided at one end of the support plate so as to extend in the circumferential direction to enclose an outer circumference of the plurality of nozzles.

An auxiliary guide part may be provided at the nozzle support between the pair of support plates so as to be curved toward the center of the flow guide member.

The flow guide member may further include a fixing block protruding from the support plate toward the head plate so as to be inserted between the nozzle casing and the head plate and fixed to the head plate.

The guide vane, the support plate, the nozzle support, and the fixing block may be integrally formed as one body.

Adjacent support plates of adjacent guide segments may be superimposed, wherein an elastic damping plate may be disposed between the adjacent support plates of the adjacent guide segments.

A further aspect of the present disclosure provides a method of forming a flow guide member disposed in a combustor to guide a flow of air, wherein the flow guide member in a circular annulus shape includes a plurality of guide segments into which the flow guide member is divided, the guide segments each including a pair of support plates, at least one guide vane extending in a circumferential direction between the pair of support plates and coupled to the guide vane at both circumferentially extended ends, a nozzle support enclosing an outer circumference of a nozzle, and a fixing block protruding from the support plates so as to be fixed to a head plate, the method including: forming each of the plurality of guide segments by: forming the support plates; simultaneously forming the nozzle support, the fixed block, and a support bar supporting the support plate and the nozzle support while forming the guide vane on the support plate, in an additive printing manner; and removing the support bar; and assembling the plurality of guide segments.

As described above, the combustor and the gas turbine according to the present disclosure includes the flow guide member having the plurality of guide segments divided into a plurality of pieces, thereby facilitating the manufacture and maintenance, as well as improving combustion efficiency through uniform distribution of compressed air.

BRIEF DESCRIPTION OF THE DRAWINGS

FIG. 2 is a cross-sectional diagram illustrating a combustor of FIG. 1;

DETAILED DESCRIPTION

Figure 1:
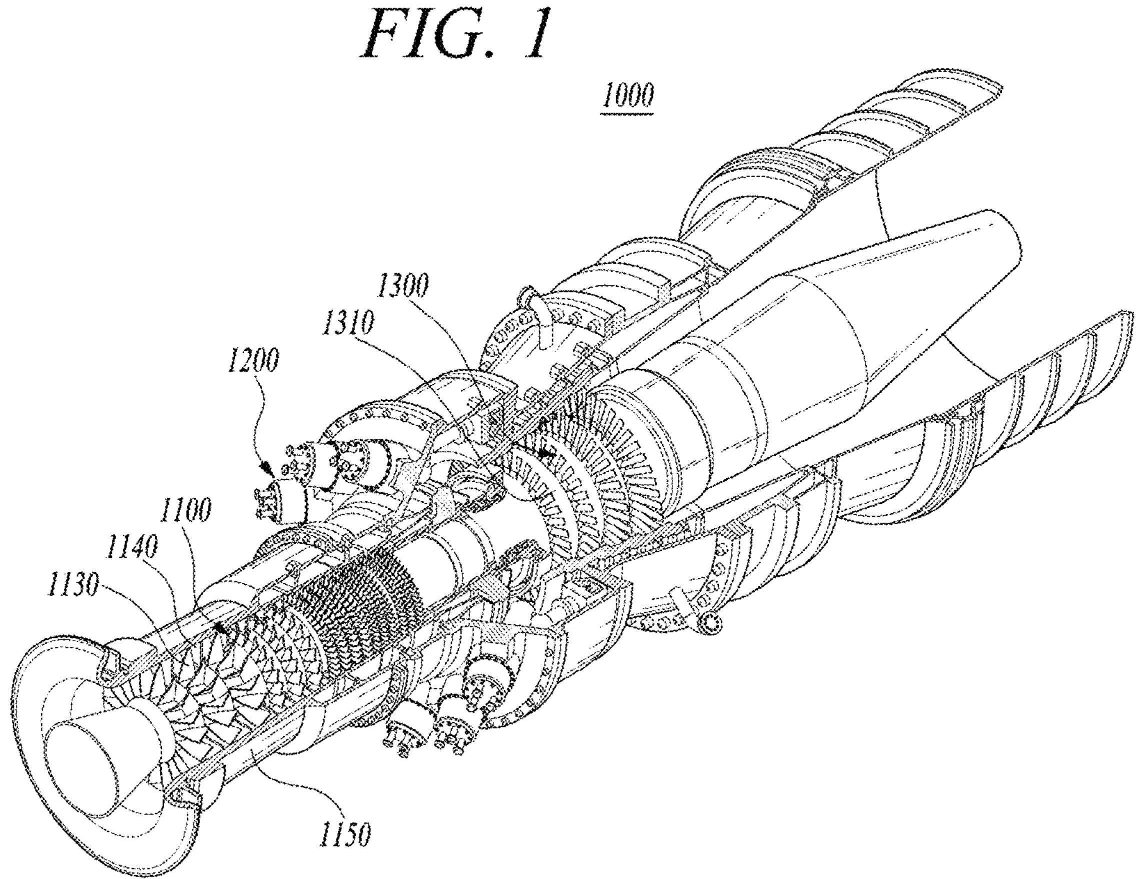
FIG. 1 is a diagram illustrating the interior of a gas turbine according to a first embodiment of the present disclosure.

Hereinafter, exemplary embodiments of the present disclosure will be described in detail with reference to the accompanying drawings. However, it should be noted that the present disclosure is not limited thereto, but may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the terms "including" or "including" specifies the presence of stated features, numbers, steps, operations, elements, parts, or combinations thereof, but does not preclude the presence or addition of one or more other features, numbers, steps, operations, elements, parts, or combinations thereof. Hereinafter, preferred embodiments of the present disclosure will be described in detail with reference to the accompanying drawings.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Hereinafter, a gas turbine according to a first embodiment of the present disclosure will be described.

Figure 2:
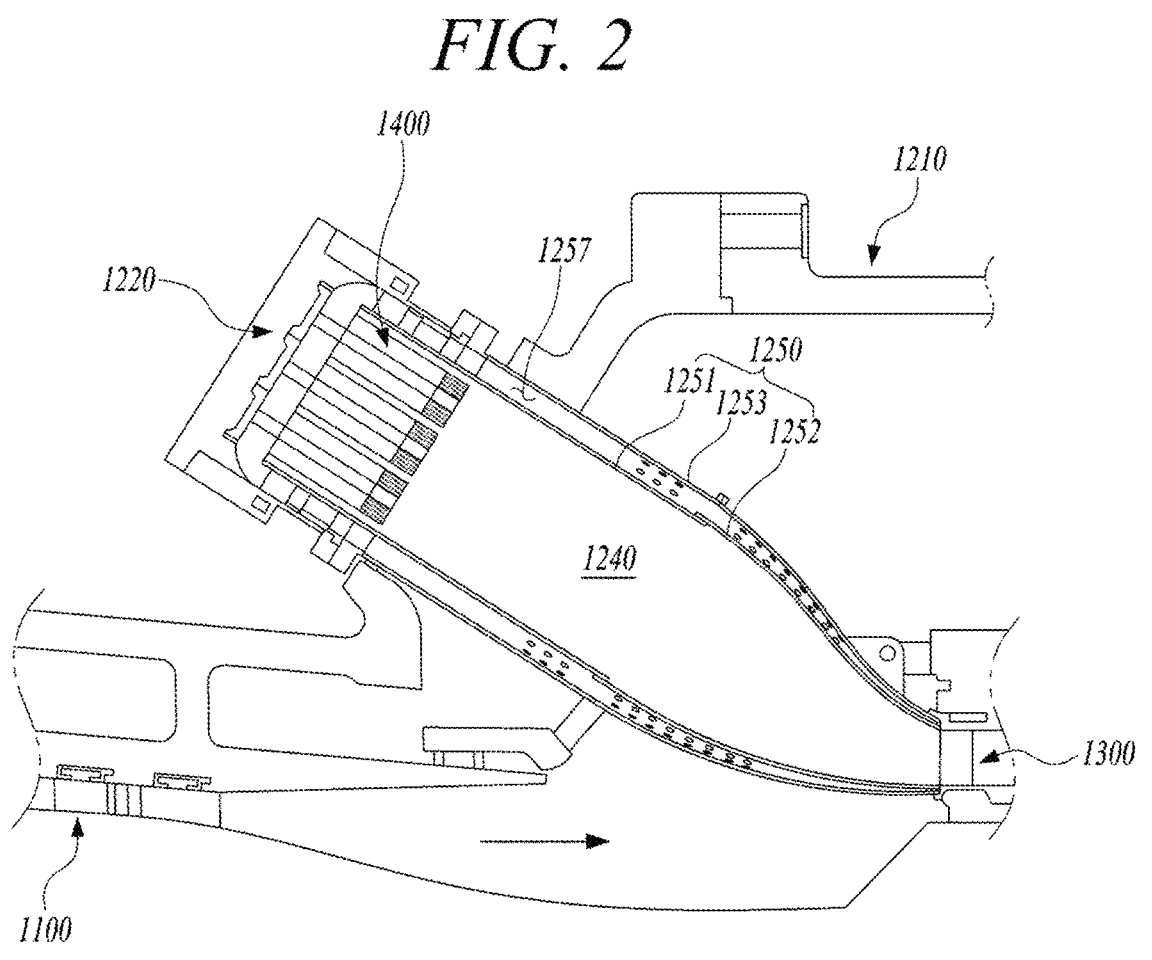

FIG. 1 is a diagram illustrating the interior of a gas turbine according to a first embodiment of the present disclosure, and FIG. 2 is a cross-sectional diagram illustrating a combustor of FIG. 1.

An ideal thermodynamic cycle of a gas turbine 1000 according to the present embodiment follows a Brayton cycle. The Brayton cycle consists of four thermodynamic processes: isentropic compression (adiabatic compression), isobaric combustion, isentropic expansion (adiabatic expansion) and isobaric heat ejection. That is, in the Brayton cycle, atmospheric air is sucked and compressed into high pressure air, mixed gas of fuel and compressed air is combusted at constant pressure to discharge heat energy, heat energy of hot expanded combustion gas is converted into kinetic energy, and exhaust gases containing remaining heat energy is discharged to the outside. That is, gases undergo four thermodynamic processes: compression, heating, expansion, and heat ejection.

As illustrated in FIG. 1, the gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIG. 1, the compressor 1100 of the gas turbine 1000 may suck and compress air. The compressor 1100 may serve both to supply the compressed air by compressor blades 1130 to a combustor 1200 and to supply the cooling air to a high temperature region of the gas turbine 1000. Here, since the sucked air undergoes an adiabatic compression process in the compressor 1100, the air passing through the compressor 1100 has increased pressure and temperature.

The compressor 1100 is usually designed as a centrifugal compressor or an axial compressor, and the centrifugal compressor is applied to a small-scale gas turbine, whereas a multi-stage axial compressor is applied to a large-scale gas turbine 1000 illustrated in FIG. 1 since the large-scale gas turbine 1000 is required to compress a large amount of air. In this case, in the multi-stage axial compressor 1100, the blades 1130 of the compressor 1100 rotate according to the rotation of the rotor disks to compress the introduced air and move the compressed air to the compressor vanes 1140 on the rear stage. As the air passes through the blades 1130 formed in multiple stages, the air is compressed to a higher pressure.

The compressor vanes 1140 are mounted inside the housing 1150 in stages. The compressor vanes 1140 guide the compressed air moved from the front side compressor blades 1130 toward the rear-side blades 1130. In one embodiment, at least some of the compressor vanes 1140 may be mounted so as to be rotatable within a predetermined range for adjustment of an air inflow, or the like.

The compressor 1100 may be driven using a portion of the power output from the turbine 1300. To this end, as illustrated in FIG. 1, the rotary shaft of the compressor 1100 and the rotary shaft of the turbine 1300 may be directly connected. In the case of the large-scale gas turbine 1000, almost half of the output produced by the turbine 1300 may be consumed to drive the compressor 1100. Accordingly, improving the efficiency of the compressor 1100 has a direct effect on improving the overall efficiency of the gas turbine 1000.

On the other hand, the combustor 1200 serves to mix the compressed air supplied from an outlet of the compressor 1100 with fuel and combust the mixture at constant pressure to produce hot combustion gases. FIG. 2 illustrates an example of the combustor 1200 provided in the gas turbine 1000. The combustor 1200 may include a combustor casing 1210, burners 1220, nozzles 1400, a duct assembly 1250, a flow guide member 1400, and a flow distribution member 1500.

The combustor casing 1210 may have a substantially cylindrical shape in which the burners 1220 are surrounded. The burners 1220 are disposed downstream of the compressor 1100 and may be disposed along the annular combustor casing 1210. Each burner 1220 is provided with a plurality of nozzles 1400, and fuel injected from the nozzles 1400 is mixed with air in an appropriate ratio to achieve a suitable state for combustion.

The gas turbine 1000 may use a gas fuel, a liquid fuel, or a combination thereof. It is important to create a combustion environment that reduces the amount of legally regulated emissions such as carbon monoxide and nitrogen oxides, so pre-mixed combustion has been widely applied in recent years, because it has the advantage of reducing emissions by lowering the combustion temperature and creating a uniform combustion, even though it is relatively difficult to control combustion.

In premixed combustion, compressed air is premixed with pre-injected fuel from nozzle 1400 and the premixed gases are introduced into a combustion chamber 1240. The premixed gases are initially ignited by an igniter and once the combustion has been stabilized, the combustion is then maintained by supplying fuel and air.

Referring to FIG. 2, the duct assembly 1250 is provided to connect the burners 1220 and the turbine 1300 so that the hot combustion gas flows therethrough to heat the duct assembly, whereas the compressed air flows towards the nozzles 1400 along an outer surface of the duct assembly 1250, thereby properly cooling the heated duct assembly 1250.

The duct assembly 1250 may include a liner 1251 and a transition piece 1252, and a flow sleeve 1253. The duct assembly 1250 has a double structure in which the flow sleeve 1253 surrounds the outside of the liner 1251 and the transition piece 1252, so that compressed air penetrates into an annular flow path 1257 formed inside the flow sleeve 1253. The air flowing along the path inside the flow sleeve 1253 may cool the liner 1251 and the transition piece 1252.

The liner 1251 is a tube member connected to the burners 1220 of the combustor 1200, wherein an internal space of the liner 1251 defines the combustion chamber 1240. A longitudinal one side of the liner 1251 is coupled to the burner 1220, and the other side of the liner 1251 is coupled to the transition piece 1252.

The transition piece 1252 is connected an inlet of the turbine 1300 to guide the hot combustion gas toward the turbine 1300. A longitudinal one side of the transition piece 1252 is coupled to the liner 1251, and the other side of the transition piece 1252 is coupled to the turbine 1300. The flow sleeve 1253 serves to protect the liner 1251 and the transition piece 1252 while avoiding direct exhaust of hot air to the outside.

A nozzle casing 1260 is coupled to an end of the duct assembly 1250, and a head plate 1270 is coupled to the nozzle casing 1260 to support the nozzles 1400.

Figure 3:
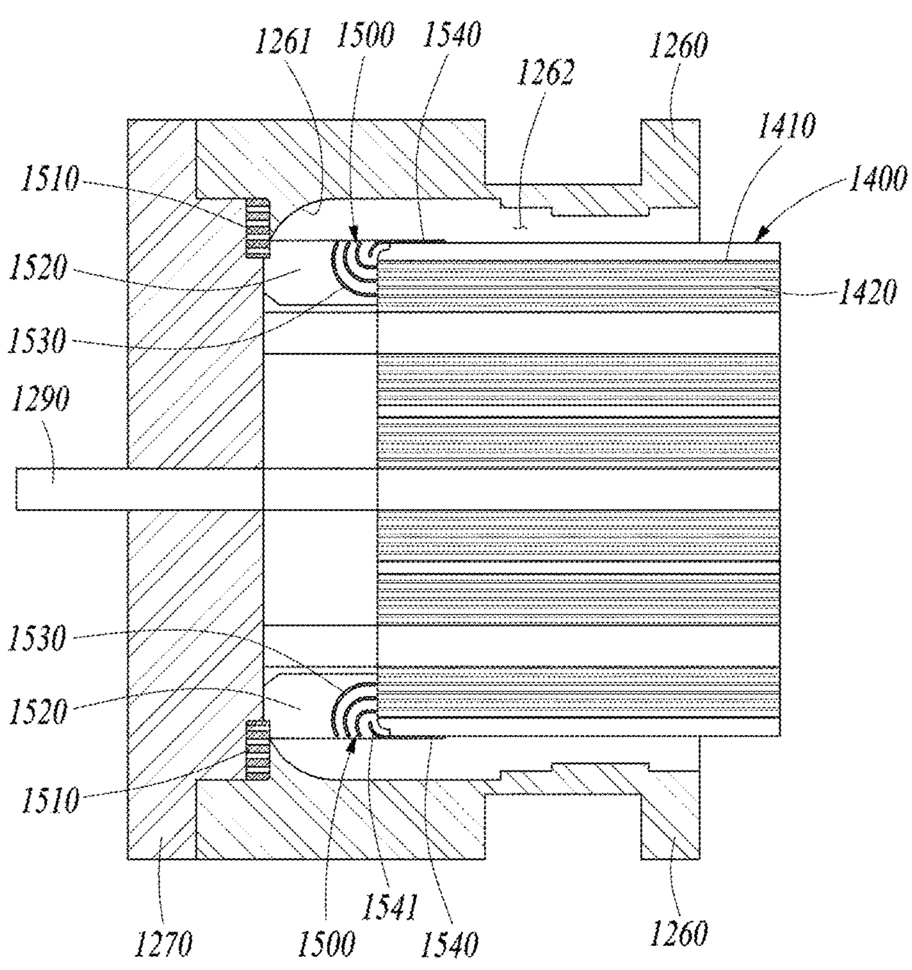
FIG. 3 is a cross-sectional diagram illustrating a portion of a combustor according to a first embodiment of the present disclosure.
Figure 4:
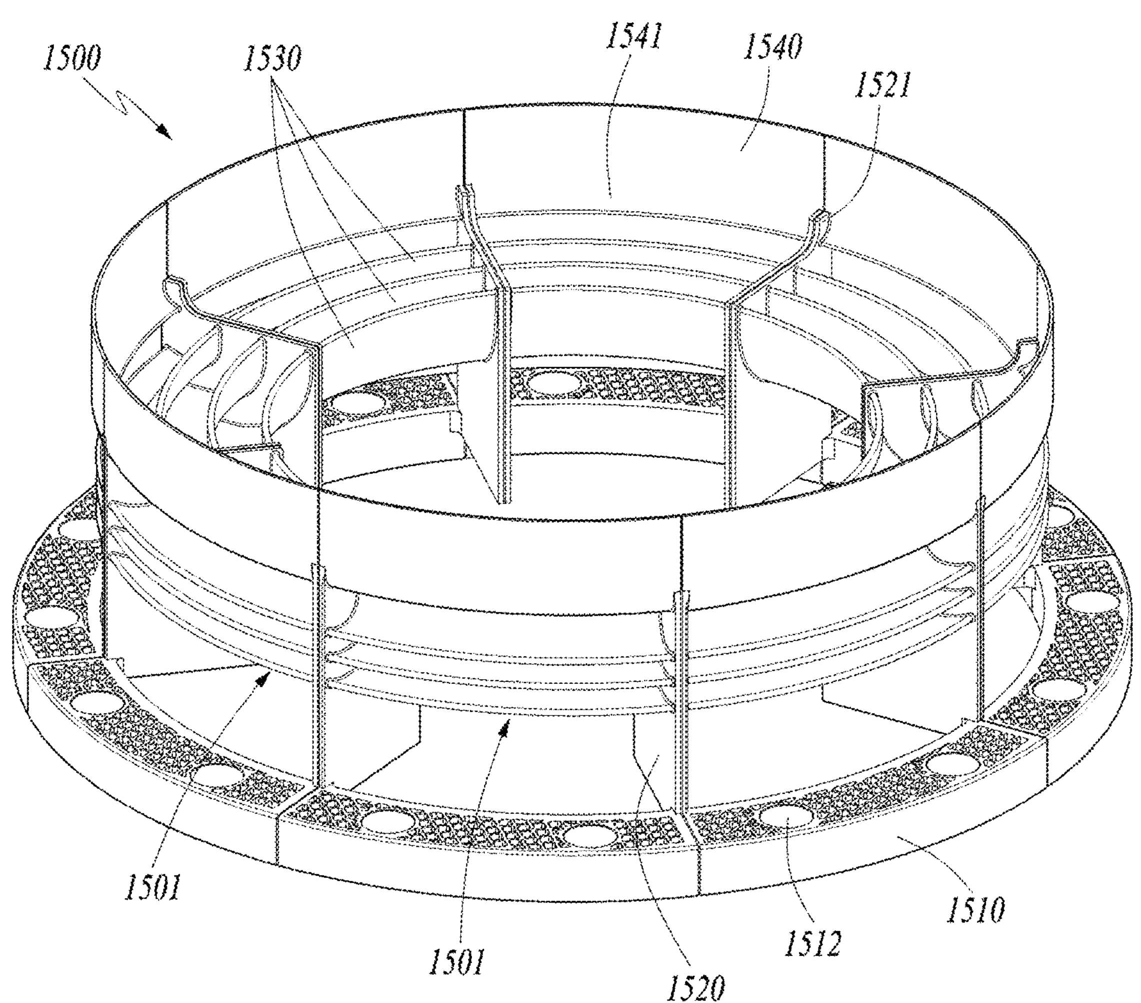
FIG. 4 is a perspective diagram illustrating a flow guide member according to a first embodiment of the present disclosure.
Figure 5:
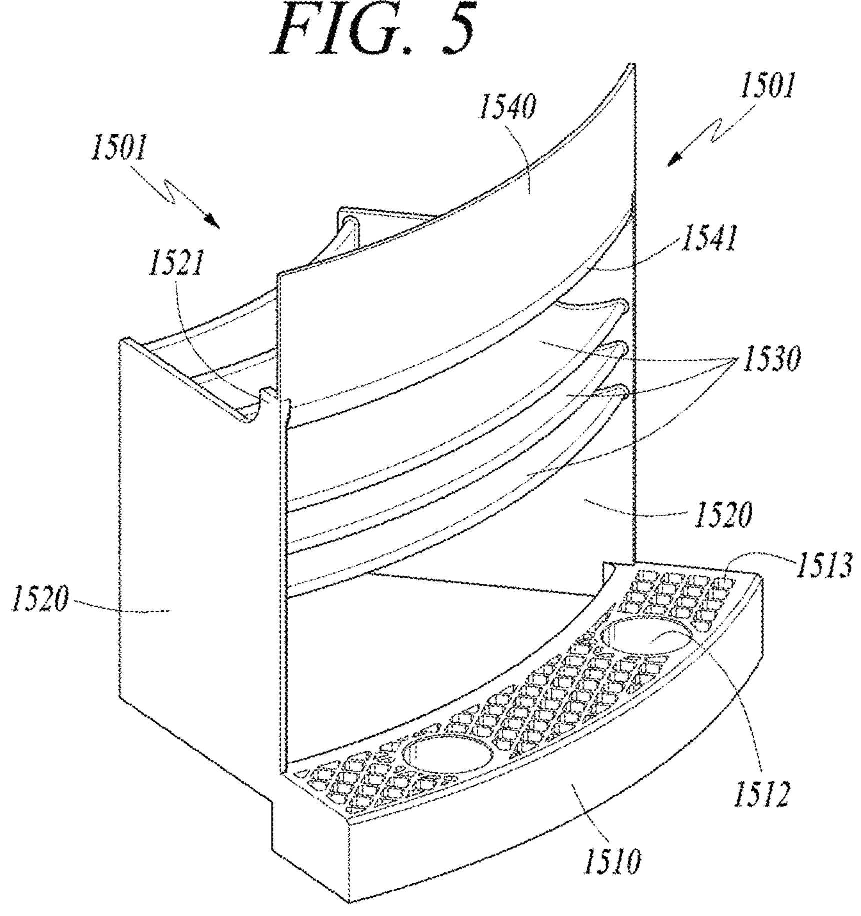
FIG. 5 is a perspective diagram illustrating a guide segment according to a first embodiment of the present disclosure.
Figure 6:
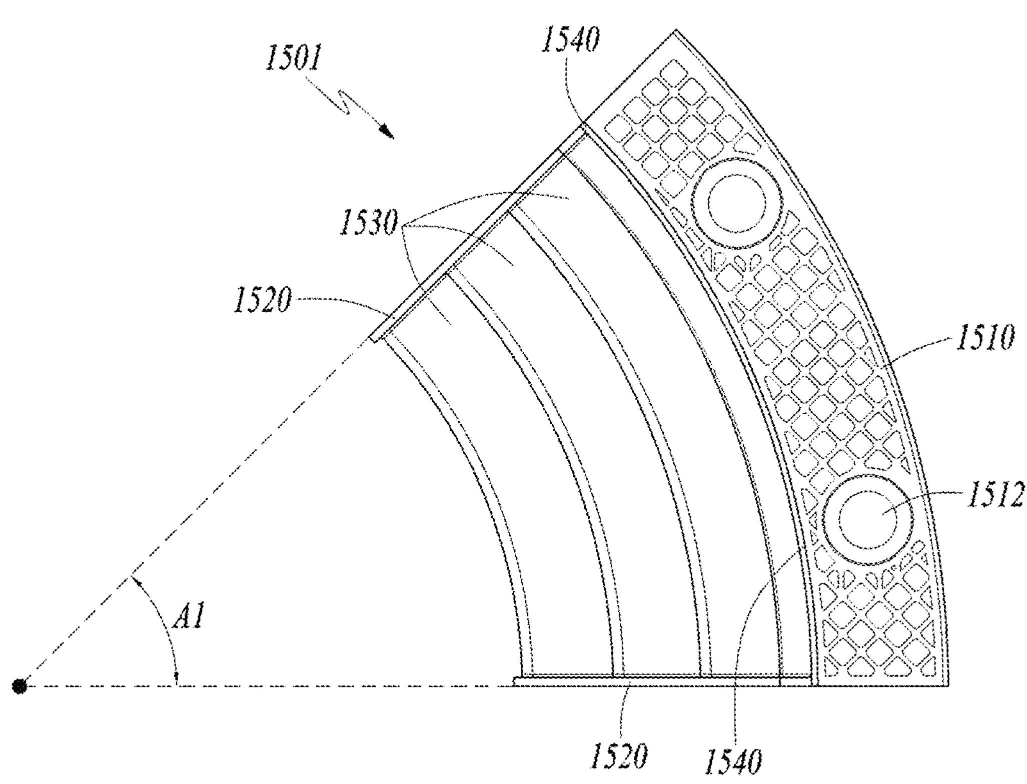
FIG. 6 is a plan view illustrating the guide segment according to the first embodiment of the present disclosure.
Figure 7A:
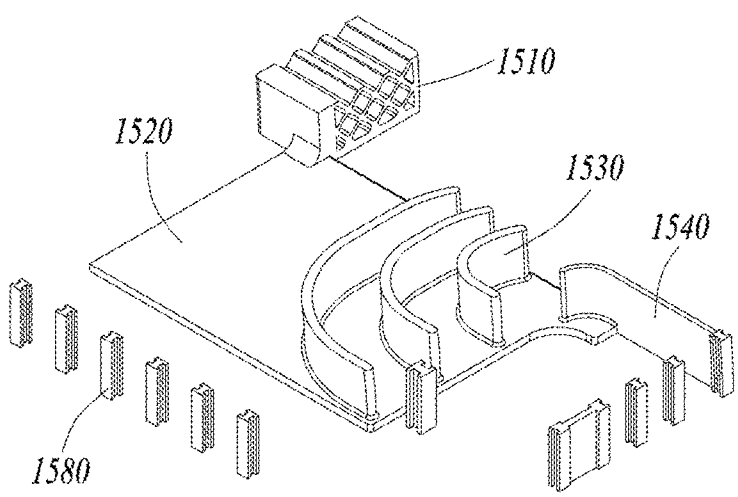
FIGS. 7A to 7D are diagrams illustrating a method of forming a flow guide member according to a first embodiment of the present disclosure.
Figure 7B:
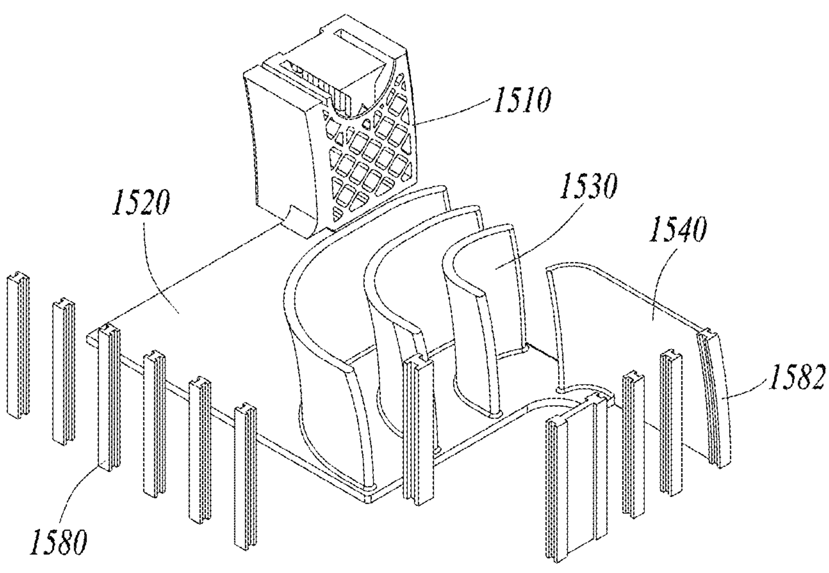
Figure 7C:
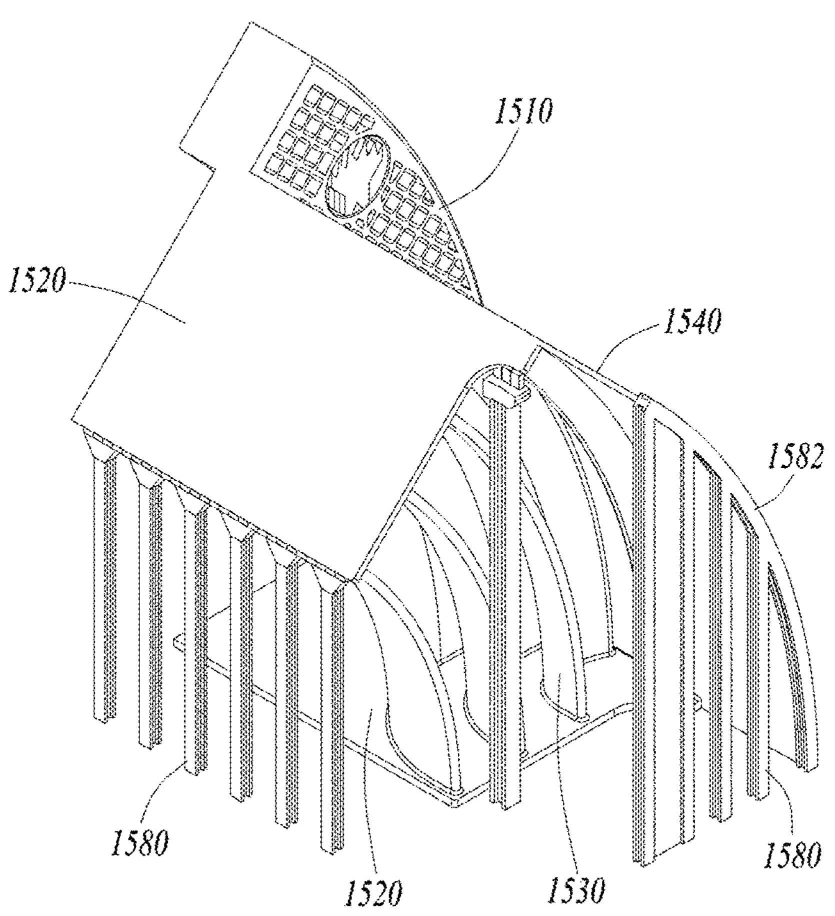
Figure 7D:
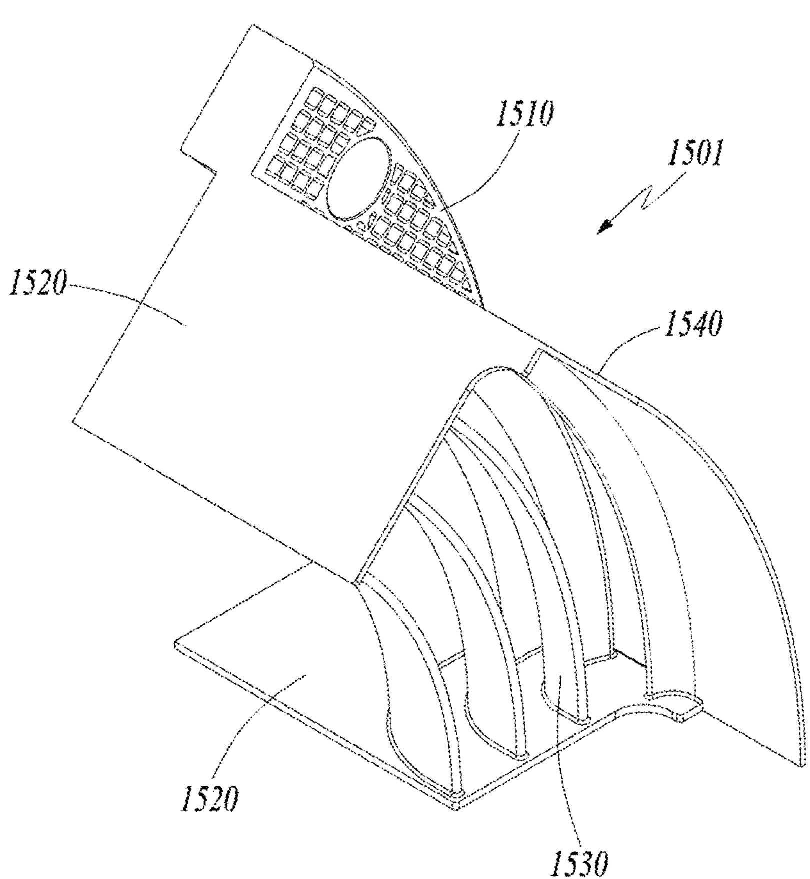

FIG. 3 is a cross-sectional diagram illustrating a portion of a combustor according to a first embodiment of the present disclosure, FIG. 4 is a perspective diagram illustrating a flow guide member according to a first embodiment of the present disclosure, FIG. 5 is a perspective diagram illustrating a guide segment according to a first embodiment of the present disclosure, and FIG. 6 is a plan view illustrating the guide segment according to the first embodiment of the present disclosure.

Referring to FIGS. 3 to 6, the nozzle casing 1260 includes a substantially cylindrical tube provided to enclose the nozzle 1400. Inside the nozzle casing 1260, one or more nozzles 1400 may be installed. When there are two or more nozzles 1400 are provided inside the nozzle casing, the two or more nozzles 1400 may be referred to as a nozzle module. The nozzle 1400 described in this specification may mean a single nozzle or a nozzle module depending on the context of the description. The nozzle module may be in a cylindrical shape defined by a side wall having a cylindrical shape.

One end of the nozzle casing 1260 is coupled to the duct assembly 1250, and the other end of the nozzle casing 1260 is coupled to the head plate 1270 installed at the rear of the nozzle casing 1260.

The head plate 1270 is a disk-shaped plate that is coupled to the nozzle casing 1260 to support the nozzle 1400. A fuel supply pipe 1290 may be installed through the head plate 1270 to supply fuel to the nozzles 1400 therethrough.

The fuel supply pipe 1290 may be elongated in a longitudinal direction along a central axis of the nozzle casing 1260. A direction from the nozzle 1400 toward the head plate 1270 in the longitudinal direction may be referred as a rear side or a rear direction, and the opposite direction may be referred to as a front side or a front direction.

The nozzle 1400 may include a plurality of mixing tubes 1420 through which air and fuel flow, and an accommodation tube 1410 that surrounds the plurality of mixing tubes 1420. The nozzle 1400 may be supplied with a hydrogen-based fuel having hydrogen as a major component. However, the present disclosure is not limited thereto, and the nozzle 1400 may be supplied with a variety of fuels, including hydrocarbon-based fuels such as natural gas, and a mixture of hydrogen-based and hydrocarbon-based fuels.

The accommodation tube 1410 may be provided with a distribution space in which fuel is dispersed and then supplied into the interior of the mixing tubes 1420. Air is supplied through the inlet end of the mixing tube 1420 and mixed with the fuel supplied into the interior of the mixing tube 1420 and then discharged through the outlet end of the mixing tube 1420.

A flow path 1262 is formed between the nozzle casing 1260 and the nozzle 1400 (or a nozzle module) so that air flows therethrough. Air flowing along the annular flow path 1257 enters the interior of the nozzle casing 1260 and flows toward the head plate 1270.

A flow guide member 1500 is disposed at a corner portion 1261 where the nozzle casing 1260 and head plate 1270 meet to guide the flow of air. The flow guide member 1500 may have an annular shape, more particularly, a circular annulus, extending around the inner circumference of the nozzle casing 1260, having the central axis at its radial center. The flow guide member 1500 may be disposed between the head plate 1270 and the nozzle 1400 (or the nozzle module).

The flow guide member 1500 includes a plurality of divided guide segments 1501, which may be segmented in a circumferential direction of the flow guide member 1500.

The guide segments 1501 each may form an annular sector with a truncated inner portion, and the guide segments 1501 may be disposed circumferentially to form a circular annulus of the flow guide member 1500.

The central angle A1 of the annular sector of each guide segment 1501 may range from 5 degrees to 180 degrees, more specifically from 30 degrees to 60 degrees, and the number of the guide segments 1501 may vary depending on the central angle A1. However, the present disclosure is not limited thereto, and the central angle A1 of the guide segment 1501 may be set to a wide range. According to an embodiment of the present disclosure, the central angles A1 of all the guide segment 1501 may have the same central angle A1, or at one of the guide segment 1510 may have a different central angle from an other guide segment 1510.

The guide segment 1501 each may include a guide vane 1530, a pair of support plates 1520, a nozzle support 1540, and a fixing block 1510. The guide segment 1501 may include one or more guide vanes 1530, for example, three guide vanes 1530, as illustrated in FIG. 4.

The guide vane 1530 may include a curved portion. The curved portion of the guide vane 1530 may be of a structure having an arc-shaped curve or multiple radii of curvature. The guide vane 1510 extends along a circumferential direction in each of the guide segment 1510.

Each of the guide vanes 1530 may be curved such that when a cross-section of the guide vane 1530 is defined in a virtual plane along the central axis, a first tangent at a radially outer end of the guide vane 1530 in the cross-section is directing to the radial center of the flow guide member 1500 (e,g, perpendicular to the longitudinal direction), and a second tangent at a radially inner end of the guide vane 1510 in the cross-section is directing to the longitudinal direction (e.g., parallel to the longitudinal direction). Each of the guide vane 1530 may be curved such that its surface is gradually bent from its radially outer end having the first tangent to its radially inner end having the second tangent.

The guide vane 1530 may further include a straight portion. The straight portion may be formed at a radially inner end of the guide vane 1530 or at a radially outer end of the guide vane 1530.

The guide vanes 1530 helps to guide a uniform supply of air to the mixing tube 1420 located on the outer side of the nozzle 1400 (or the nozzle module). The guide vanes 1530 are radially spaced apart from each other and may extend around the inner circumference of the flow guide member 1500.

When the flow guide member 1500 is viewed from a side (i.e., viewed in a radial direction from outside), the radially outer ends of the guide vanes 1530 may be spaced apart from each other in the longitudinal direction. The spaces formed between the adjacent radially outer ends of the guide vanes and viewed from the side are air inlets.

When the flow guide member 1500 is viewed from a front side (i.e. viewed in a longitudinal direction), the radially inner ends of the guide vanes 1530 may be spaced apart from each other in the radial direction. The spaces formed between adjacent radially inner ends of the guide vanes and viewed from the front side are air outlets.

In a space between the head plate 1270 and the nozzle 1400 (or the nozzle module), the guide vanes 1530 may be disposed relatively closer to the nozzle 1400 (or the nozzle module) than the head plate 1270 in the longitudinal direction.

The pair of support plates 1520 are provided on the guide segment 1501 such that the circumferential extension ends of the guide vane 1530 are fixed thereto. The guide vanes 1530 of a guide segment 1501 is disposed between the two support plates 1520 of the guide segment 1501.

The support plate 1520 may be a flat plate that extends in a radial direction and a longitudinal direction of the flow guide member 1500. The support plate 1520 has a support protrusion 1521 at a portion positioned at a radially outer and front end, which is to be connected to the nozzle support 1540 and facing a rear end of the nozzle 1400. The support plates 1520 are combined with the guide vane 1530, the nozzle support 1540, and the fixing block 1510 to support them. Additionally, a support plate 1520 of one guide segment 1501 may be disposed so as to overlap and abut against another support plate 1520 of a neighboring guide segment 1501. In other words, one support plate 1520 of a guide segment 1510 may abut against and attached to one support plate 1520 of an adjacent guide segment 1510.

Each nozzle support 1540 protrudes in the longitudinal direction from a front and radially outer end of a support plate 1520 and extends around the circumference of the nozzle 1400 (or the nozzle module) to enclose the outer circumference of the nozzle 1400 (or the nozzle module).

The plurality of nozzle supports 1540 may be connected together into a tubular shape to enclose the circumference of the nozzle 1400.

In addition, an auxiliary guide part 1541 may be formed at a portion between the support plates 1520 on the nozzle support 1540 so as to be curved toward the center of the flow guide member 1500. The auxiliary guide part 1541 is formed at the rear end of the nozzle support 1540 facing the head plate 1270 and is fixed to the support protrusions 1521. The auxiliary guide part 1541 may be formed at the rear end of the auxiliary guide part 1541 by curvedly bent radially inwardly.

The auxiliary guide part 1541 may be curved in an arc shape, and prevents the air flow from forming vortices and guides the flow into the guide vane 1530.

When the nozzle support 1540 is formed in this manner, the flow guide member 1500 may be reliably coupled to the nozzle 1400, as well as more reliably guide the air flow to reliably prevent vortices from being generated.

The fixing block 1510 protrudes from a rear and radially outer end of the support plate 1520 toward the head plate 1270 and is secured to the head plate 1270. The plurality of fixing blocks 1510 may be continuously arranged in a looped configuration.

The fixing block 1510 also protrudes from the rear and radially outer end of the support plate 1520 toward radially outward. In one guide segment 1501, the fixing block 1510 extends in a circumferential direction from one support plate 1520 to the other support plate 1520. When a cross-section of the fixing block 1510 defined in a virtual plane along the central axis, the cross-section of the fixing block 1510 may have a rectangular shape having a predetermined thickness in the longitudinal direction and a predetermined width in the radial direction.

The fixing block 1510 may be inserted between the nozzle casing 1260 and the head plate 1270, and may be secured to the head plate 1270 by bolts or the like. A fixing hole 1512 may be formed in the fixing block and in the head plate 1270 for insertion of the bolt.

The fixing block 1510 may have a plurality of openings 1513 formed to penetrate through its thickness in the longitudinal direction. When the fixing block 1510 is formed in this manner, the flow guide member 1500 may be stably secured within the burner.

When the flow guide member 1500 includes multiple guide segments 1501 as in the present embodiment, it is easier to fabricate and install. Additionally, if a problem occurs with the flow guide member 1500, it may be easily resolved by replacing only the problematic the guide segments 1501. Furthermore, the guide vane 1530, the support plates 1520, the nozzle support 1540, and the fixing block 1510 of the guide segment may be integrally formed by three-dimensional printing, which facilitates fabrication of the guide segment 1501.

Figure 8:
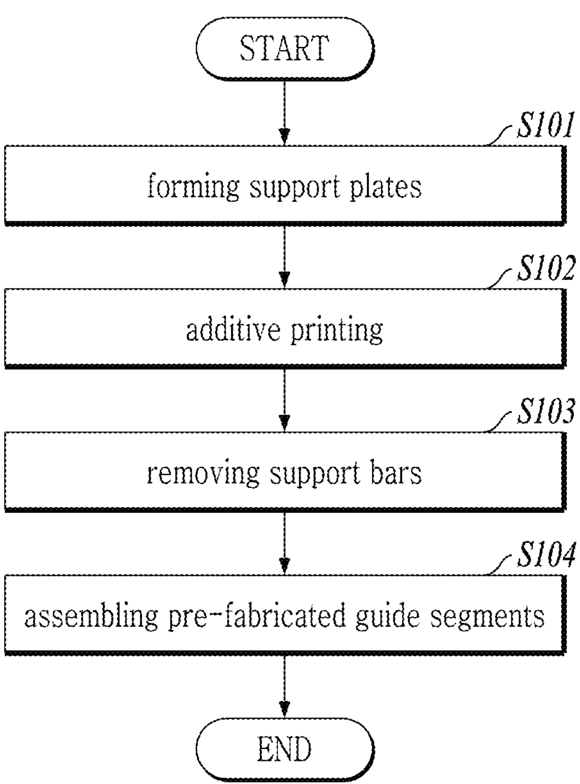
FIG. 8 is a flowchart illustrating the method of manufacturing the flow guide member according to the first embodiment of the present disclosure.

FIGS. 7A to 7D are diagrams illustrating a method of forming a flow guide member according to a first embodiment of the present disclosure, and FIG. 8 is a flowchart illustrating the method of manufacturing the flow guide member according to the first embodiment of the present disclosure.

Referring to FIGS. 7A to 7D, and FIG. 8, the method of manufacturing the flow guide member according to the first embodiment of the present disclosure includes manufacturing guide segments 1501 by a three-dimensional printing method using a three-dimensional printing machine, and assembling the guide segments 1501 to form a flow guide member 1500.

The method of manufacturing the flow guide member may include forming support plates 1520 in step S101, simultaneously forming a nozzle support 1540, a fixing block 1510, and support bars 1580 while forming a guide vane 1530 on the support plates 1520, in an additive printing manner in step S102, removing the support bars 1580 in step S103, and assembling pre-fabricated guide segments 1501 in step S104.

In support plate-forming step S101, a first one of a pair of the support plates 1520 may be formed on a floor of the three-dimensional printing machine. Also, at the same time, the bases of the nozzle support 1540, the fixing block 1510, and the support bars 1580 may also be formed, in a three-dimensional printing manner.

The positions of the bases of the support bars 1580 are determined to match corresponding positions on a second one of the pair of the support plates 1520 or on the nozzle support 1540. In other words, the positions of the bases of the support bars 1580 are the same positions of the corresponding positions on the second one of the pair of the support plate 1520 or on the nozzle support 1540 when the guide segment 1501 is viewed in a direction perpendicular to the first one of the pair of the support plates. Therefore, during the process of forming one guide segment 1501, the support bars 1580 are connected to the corresponding position on the second one of the pair of the support plate 1520 or on the nozzle support 1540.

In the additive printing stage S102, the guide vane 1530 may be formed on the first one of the pair of the support plates 1520, and at the same time, the nozzle support 1540 and the fixing block 1510 may be integrally connected to the support plates 1520 and the support bars 1580 may be formed at positions spaced apart from the support plates 1520.

Also in additive printing state S102, a support rim 1582 may be formed to extend in an arcuate shape along an front end of the nozzle support 1540 to support the nozzle support 1540.

In the additive printing step S102, some of the support bars 1580 may be formed so as to be connected to the second one of the pair of the support plates 1520, and some of the support bars 1580 may be formed so as to be connected to the nozzle support 1540.

In the support bar removal stage S103, when forming of all parts in one guide segment 1501 is completed, the support bars 1580 connected to the nozzle support 1540 and the support plate 1520, and the support rim 1582 connected to the nozzle support 1540 may be removed. To note, throughout the entire process of forming one guide segment 1501 from beginning to end, all the parts of the guide segment 1501 such as the pair of the support plates 1520, guide vanes 1530, the nozzle support 1540, and the fixing block 1510 remain integrally connected.

In the segment assembly stage S104, the plurality of pre-fabricated guide segments 1501 may be assembled such that the support plates 1520 of one segment abut against the support plates of an adjacent segment, thereby forming an annular flow guide member 1500.

As such, in this embodiment, the flow guide member 1500 is constructed from a plurality of guide segments 1501, each of which may be easily fabricated by three-dimensional printing. Furthermore, the guide segments 1501 may be fabricated stably because the support bars 1580 and the support rim 1582 support the structure of the guide segments 1501 during the 3D printing process.

The following describes a flow guide member according to a second embodiment of the present disclosure.

Figure 9:
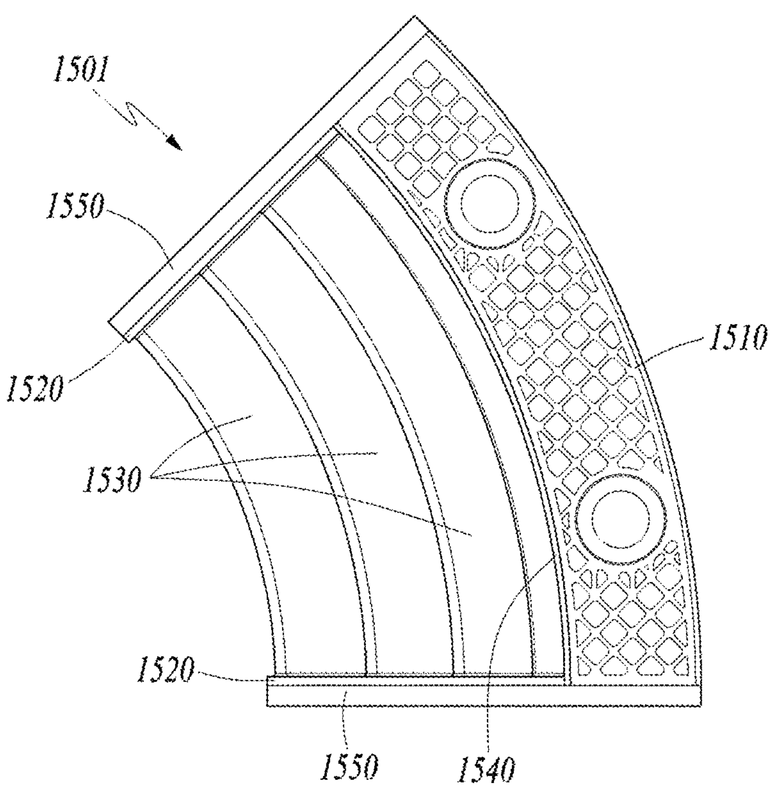
FIG. 9 is a plan diagram illustrating a guide segment according to a second embodiment of the present disclosure.

FIG. 9 is a plan diagram illustrating a guide segment according to a second embodiment of the present disclosure.

Referring to FIG. 9, the flow guide member 1500 according to the second embodiment has the same structure as the flow guide member according to the first embodiment described above, except for a damping plate 1550, so a redundant description of the same configuration will be omitted.

The guide segment 1501 includes a pair of support plates 1520, each of which is equipped with a damping plate 1550 to reduce vibration. The pair of the damping plates 1550 may be provided such that each damping plate abuts the corresponding support plate 1520 and the pair of the support plates 1520, the guide vanes 1530, the nozzle support 1540 and the fixing block 1510 are disposed between the two damping plates 1550. The dampening plate 1550 is made of a resilient material, such as metal, synthetic resin, or the like, which is more resilient than the guide segment 1501. If the dampening plate 1550 is made of metal, the dampening plate may be formed as a porous plate.

Further, the elastic modulus of the dampening plate 1550 disposed on one side may be formed to be larger than the elastic modulus of the dampening plate 1550 disposed on the other side. Accordingly, the two damping plates 1550 with different elasticity are in contact with each other to prevent vibration and noise more reliably.

Hereinafter, a flow guide member according to a third embodiment of the present disclosure will be described.

Figure 10:
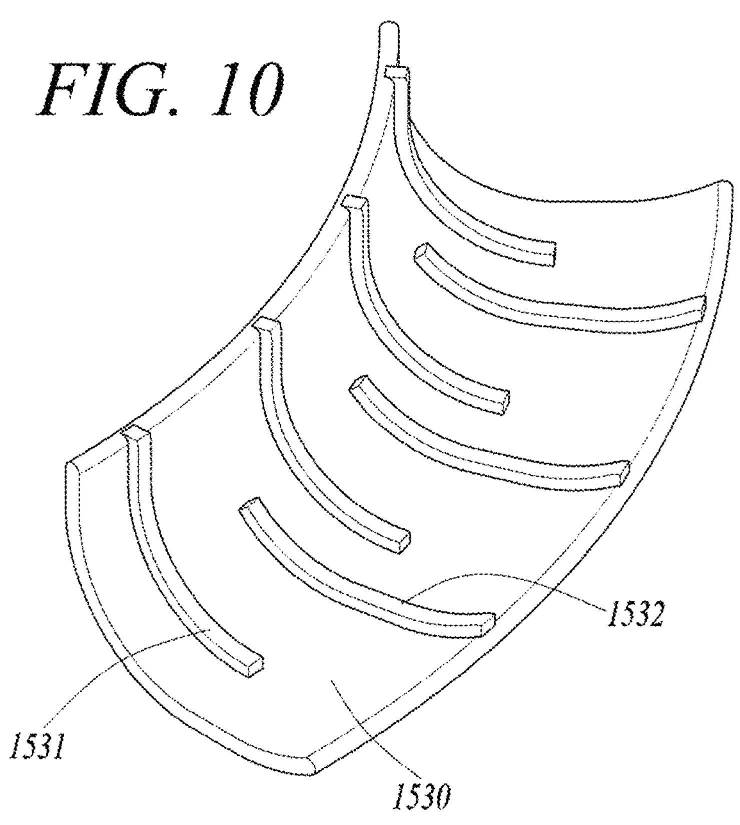
FIG. 10 is a perspective diagram illustrating a guide vane according to a third embodiment of the present disclosure.

FIG. 10 is a perspective diagram illustrating a guide vane according to a third embodiment of the present disclosure.

Referring to FIG. 10, the flow guide member 1500 according to the third embodiment has the same structure as the flow guide member according to the first embodiment described above, except for a first guide rib 1531 and a second guide rib 1532, so a redundant description of the same configuration will be omitted.

The guide vane 1530 is provided with first guide ribs 1531 extending from the air outlet toward the air inlet and second guide ribs 1532 extending from the air inlet toward the air outlet.

The first guide rib 1531 extends from the air outlet to pass beyond the widthwise center (in the radial direction) of the guide vane 1530. A first longitudinal end of the first guide rib 1531 may be located at the air outlet, and a second longitudinal end of the first guide rib may be located inside the guide vane 1530 (i.e., the extending end of the first guide rib 1531 not reaching the air inlet).

The second guiding rib 1532 extends from the air inlet to pass beyond the widthwise center (in the radial direction) of the guide vane 1530. A first longitudinal end of the second guide rib 1532 may be located at the air inlet, and a second longitudinal end of the second guide rib may be located inside the guide vane 1530 (i.e., the extending end of the second guide rib 1532 not reaching the air outlet).

Also, the first guide ribs 1531 and the second guide ribs 1532 may be alternately arranged to partially overlap each other so that the second guide ribs 1532 may be disposed between the first guide ribs 1531.

When the first guide ribs 1531 and the second guide rib 1532 are formed on the guide vane 1530 as in this third embodiment, the configuration may prevent swirls from being generated in the air flowing along the guide vane 1530 and provide a uniform and stable supply of air to the nozzle 1400.

While the embodiments of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure. Also, it is noted that any one feature of an embodiment of the present disclosure described in the specification may be applied to another embodiment of the present disclosure. Similarly, the present invention encompasses any embodiment that combines features of one embodiment and features of another embodiment.

The invention claimed is:

1. A combustor comprising:

a nozzle casing having a tubular shape;

a head plate coupled to an end of the nozzle casing;

a burner having a plurality of nozzles; and a duct assembly coupled to one side of the burner to allow a fuel to be combusted therein and combustion gases to be transferred to a turbine, wherein the burner further comprises a flow guide member in a circular annulus shape installed between the plurality of nozzles and the nozzle casing to guide a flow of air into the plurality of nozzles, wherein the flow guide member includes a plurality of guide segments, into which the flow guide member is divided, where the flow guide member is divided into the plurality of guide segments in a circumferential direction of the flow guide member, each guide segment of the plurality of guide segments being in a shape of an annular sector, the plurality of guide segments, when assembled, forming the circular annulus shape, wherein each guide segment comprises a pair of support plates and at least one guide vane, a first one of the pair of support plates disposed at one circumferential end of the respective guide segment and a second one of the pair of support plates disposed at an opposing circumferential end of the respective guide segment, the at least one guide vane extending in the circumferential direction from the first one of the pair of support plates disposed at the one circumferential end of the respective guide segment to the second one of the pair of support plates disposed at the opposing circumferential end of the respective guide segment.

2. The combustor of claim 1, wherein the shape of the annular sector of the each guide segment has a central angle of 5 degrees to 180 degrees.

3. The combustor of claim 1, wherein the guide segment further comprises a nozzle support provided at one end of one of the pair of support plates so as to extend in the circumferential direction to enclose an outer circumference of the plurality of nozzles.

4. The combustor of claim 3, wherein an auxiliary guide part is provided at the nozzle support between the pair of support plates so as to be curved toward the center of the flow guide member.

5. The combustor of claim 3, wherein the flow guide member further comprises a fixing block protruding from the pair of support plates toward the head plate so as to be inserted between the nozzle casing and the head plate and fixed to the head plate.

6. The combustor of claim 5, wherein the guide vane, the pair of support plates, the nozzle support, and the fixing block are integrally formed as one body.

7. The combustor of claim 1, wherein adjacent support plates of adjacent guide segments abut each other in the circumferential direction, wherein an elastic damping plate is disposed between the adjacent support plates of the adjacent guide segments.

8. The combustor of claim 1, wherein the guide vane has a plurality of first guide ribs extending from an air inlet end toward an air outlet end, and a plurality of second guide ribs extending from the air outlet end toward the air inlet end, wherein the first guide ribs and the second guide ribs are alternately arranged so as to partially overlap each other in a longitudinal direction of the guide vane.

9. The combustor of claim 1, wherein the guide segment is manufactured by three-dimensional printing.

10. A gas turbine comprising:

a compressor compressing externally introduced air;

a combustor mixing the compressed air from the compressor with fuel to produce a mixture and combusting the mixture; and a turbine having a plurality of turbine blades rotated by combustion gases from the combustor, wherein the combustor comprises:

a nozzle casing having a tubular shape;

a head plate coupled to an end of the nozzle casing;

a burner having a plurality of nozzles; and a duct assembly coupled to one side of the burner to allow the mixture to be combusted therein and combustion gases to be transferred to the turbine, wherein the burner further includes a flow guide member in a circular annulus shape installed between the plurality of nozzles and the nozzle casing to guide a flow of the compressed air into the plurality of nozzles, wherein the flow guide member comprises a plurality of guide segments, into which the flow guide member is divided, where the flow guide member is divided into the plurality of guide segments in a circumferential direction of the flow guide member, each guide segment of the plurality of guide segments being in a shape of an annular sector, the plurality of guide segments, when assembled, forming the circular annulus shape, wherein each guide segment comprises a pair of support plates and at least one guide vane, a first one of the pair of support plates disposed at one circumferential end of the respective guide segment and a second one of the pair of support plates disposed at an opposing circumferential end of the respective guide segment, the at least one guide vane extending in the circumferential direction from the first one of the pair of support plates disposed at the one circumferential end of the respective guide segment to the second one of the pair of support plates disposed at the opposing circumferential end of the respective guide segment.

11. The gas turbine of claim 10, wherein the guide segment further comprises a nozzle support provided at one end of one of the pair of support plates so as to extend in the circumferential direction to enclose an outer circumference of the plurality of nozzles.

12. The gas turbine of claim 11, wherein an auxiliary guide part is provided at the nozzle support between the pair of support plates so as to be curved toward the center of the flow guide member.

13. The gas turbine of claim 11, wherein the flow guide member further comprises a fixing block protruding from the pair of support plates toward the head plate so as to be inserted between the nozzle casing and the head plate and fixed to the head plate.

14. The gas turbine of claim 13, wherein the guide vane, the pair of support plates, the nozzle support, and the fixing block are integrally formed as one body.

15. The gas turbine of claim 10, wherein adjacent support plates of adjacent guide segments abut each other in the circumferential direction, wherein an elastic damping plate is disposed between the adjacent support plates of the adjacent guide segments.

* * * * *